United States Patent [19]

Godard et al.

[11] 4,294,309

[45] Oct. 13, 1981

[54] METHOD OF CONTROLLING THE HEATING OF A CHAMBER AND A CONTROLLED CHAMBER-HEATING INSTALLATION

[75] Inventors: Pierre Godard, Tremblay les Gonesse; Michel Billot, Drancy, both of France

[73] Assignee: Saft-Societe des Accumulateurs Fixes et de Traction, Romainville, France

[21] Appl. No.: 91,100

[22] Filed: Nov. 5, 1979

[30] Foreign Application Priority Data

Nov. 16, 1978 [FR] France .................................. 78 32373

[51] Int. Cl.³ .............................................. F24D 11/00
[52] U.S. Cl. ....................................... 165/18; 126/421; 126/422; 126/400; 237/8 R
[58] Field of Search ....................... 126/421, 422, 400; 165/18, 104 S; 237/8 R

[56] References Cited

U.S. PATENT DOCUMENTS 3,977,601 8/1976 Bearzi .................................. 126/421

FOREIGN PATENT DOCUMENTS 2518620 11/1976 Fed. Rep. of Germany ...... 126/422
2377011 4/1978 France ................................ 126/422
1537922 1/1979 United Kingdom ................ 126/422

*Primary Examiner*—Albert J. Makay
*Assistant Examiner*—Henry Bennett
*Attorney, Agent, or Firm*—Kenyon & Kenyon

[57] ABSTRACT

Circulation of a heat-conveying fluid between a solar energy collector (CS) and a water heater chamber (10) is stopped when the temperature $t_A$ of a sensor placed at the outlet of the collector is lower than a temperature $t_B + Dt$, where the temperature $t_B$ is that of a sensor placed at the inlet to the heat exchanger of the water heater, where a temperature $t_C$ is that of a sensor placed at the outlet of the heat exchanger, and Dt is a temperature offset which increases with a decrease in the temperature difference $t_B - t_C$.

3 Claims, 3 Drawing Figures

METHOD OF CONTROLLING THE HEATING OF A CHAMBER AND A CONTROLLED CHAMBER-HEATING INSTALLATION

The present invention relates to a method of controlling the heating of a chamber which contains a medium to be heated, e.g. water. It relates more particularly to the storage of solar energy by the medium contained in said chamber. For this purpose, a fluid called a heat-conveying fluid is used. By means of one heat exchanger, the fluid takes up heat from a source constituted by a solar energy collector and by means of another heat exchanger it transfers its heat to the medium in the chamber. The invention also relates to a controlled installation which applies the method to heating a storage chamber.

Storing solar energy (e.g. for heating water in a solar energy water heating, which then constitutes the previously mentioned chamber), requires a control system to provide transfer of heat between the solar collector and the water to be heated when the temperature of the solar collector is higher than that of the water and to stop such transfer in the contrary case. At present, a differential thermostat with two bulbs is used, one of which measures the temperature of the solar collector while the other measures the outlet temperature of the heat-conveying fluid after it passes through the water heater, e.g., at the bottom of the other heat exchanger disposed in the water heater, since it is preferable for the heat-conveying fluid to circulate in the other heat exchanger in a downwards direction so that it initially transfers its heat to the hottest water. When the temperature of the solar collector is higher than the outlet temperature of the water heater, circulation is started and it is stopped in the contrary case. This type of the thermostat has an operational inertia of several degrees centigrade. Further, it has a great disadvantage: in the case where even a small quantity of hot water is drawn off, cold water replaces it in the lower part of the water heater and circulation is started even if the average temperature of the water is higher than the temperature of the solar collector, because the temperature of the fluid at the outlet is lowered by the cold water in the bottom of the water heater. If the temperature of the solar collector lies between the average temperature of the chamber and the outlet temperature of the heat conveying fluid, this can cool the water at the top of the heat exchanger instead of heating it.

The present invention provides a control method for controlling the heating of at least one heat storage chamber by means of a heat-conveying fluid, the method comprising:

providing a fluid circuit which includes a heat source, a heat storage chamber and controllable means for ensuring the circulation of a heat-conveying fluid from the heat source and through the heat storage chamber;

sensing the temperature $t_A$ of the heat-conveying fluid at its outlet from the heat source, the temperature $t_B$ of the heat-conveying fluid at its inlet to the heat storage chamber, and the temperature $t_C$ of the heat-conveying fluid at its outlet from the heat storage chamber; and controlling said controllable means to ensure that the heat-conveying fluid circulates from the heat source and through the heat storage chamber when $t_A$ is greater than $t_B + Dt$, and that the fluid stops circulating at least through the heat storage chamber, when $t_A$ is less than $t_B + Dt$, where $Dt$ is a temperature offset such that the smaller the difference $t_B - t_C$, the greater the offset $Dt$.

The invention also provides an arrangement applying the method of the invention.

An implementation of the method of the invention is described by way of example with reference to the accompanying drawings in which.

Figure 1:
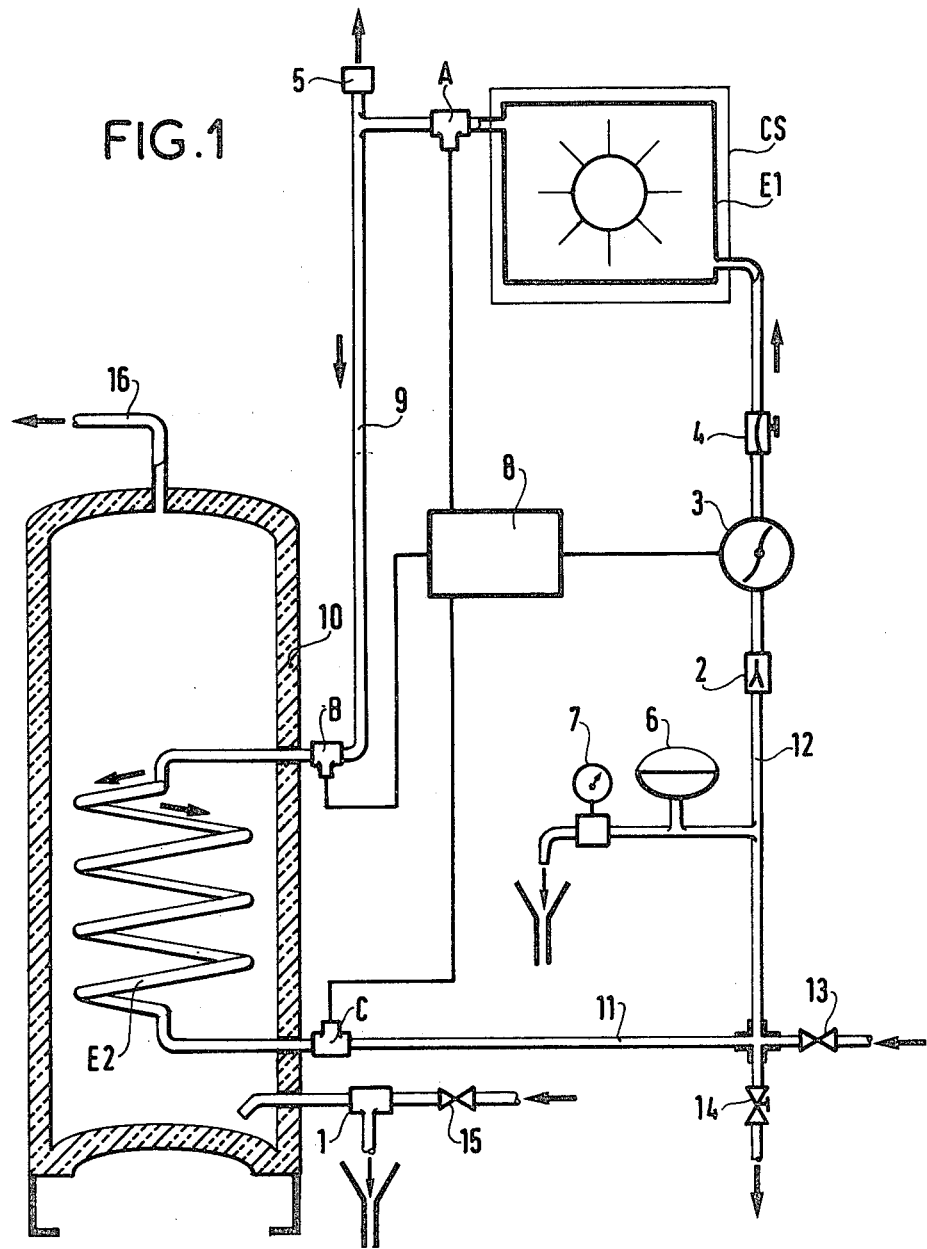
FIG. 1 illustrates schematically an implementation both of the method of the present invention and of other methods.

FIG. 1 illustrates a solar energy water heating system having a solar energy collector CS which contains a first heat exchanger E1 at whose output there is a temperature sensor A which senses a temperature $t_A$. The fluid which leaves the heat exchanger flows along a pipe 9 till it reaches a second heat exchanger E2 which is placed inside a thermally insulated chamber 10. A temperature sensor B at the input of the heat exchanger E2 senses a temperature $t_B$ and a temperature sensor C at the output of the heat exchanger E2 senses a temperature $t_C$. The fluid is returned to the input of the heat exchanger E1 in the solar energy collector CS via pipes 11 and 12. A pump 3 pumps the fluid, and the fluid flow is regulated by a throttle 4, while a non-return valve 2 prevents the fluid from flowing in the wrong direction. The pump 3 is controlled by a differential thermostat 8 which receives the readings of three sensors A, B and C located, respectively, at the outlet of heat exchanger E1, at the inlet of heat exchanger E2, and at the outlet of heat exchanger E2. Naturally, the heat conveying circuit is provided with an automatic bleed valve 5, an expansion chamber 6 with a membrane and a safety valve 7 with a pressure gauge, as well as a filler valve 13 and a drain cock 14. In the example illustrated, the heat-conveying fluid is water to which anti-freeze and an anti-corrosion product are added.

Water to be heated arrives cold in the chamber 10 via a cock 15 and it leaves the chamber hot via a pipe 16. The sensor B is located at the point where the heat conveying fluid enters the water heater whereby it measures the hottest water temperature. Operation in some cases, but without applying the method of the present invention may proceed as follows:

Provided (1) temperature $t_A$ is higher than or equal to temperature $t_B$ and (2) temperature $t_B$ is higher than temperature $t_C$, the heat-conveying fluid may be circulated. In contrast, circulation should be stopped as soon as (1) $t_A$ is less than $t_B$ to prevent cooling the storage chamber or (2) $t_B$ is less than or equal to $t_C$, since it is pointless to waste energy pumping the heat-conveying fluid when no heat can be transferred.

Thus when the temperature $t_A$ of the heat source represented by the solar collector CS is high (i.e. while the sun is heating it) and while the water in the water heater 10 is cold, $t_A$ will be higher than $t_B$ which will be higher than $t_C$. The pump 3 operates to circulate the heat conveying fluid, causing $t_B$ and $t_C$ to rise until, if no hot water is drawn off, $t_B$ is equal to $t_C$. The pump stops, since no heat transfer is taking place any longer in the heat exchanger E2. If hot water is drawn off, cold water arrives in the water heater, $t_C$ drops below $t_B$, and the pump is restarted.

When the sun goes in, temperature $t_A$ drops and, on its dropping below $t_B$, the pump is stopped in order to prevent the heat conveying fluid from cooling down the water in the water heater even if $t_B$ remains higher than $t_C$. The circulation is restarted only when $t_A$ is higher than $t_B$ and $t_B$ is higher than $t_C$.

Figure 2:
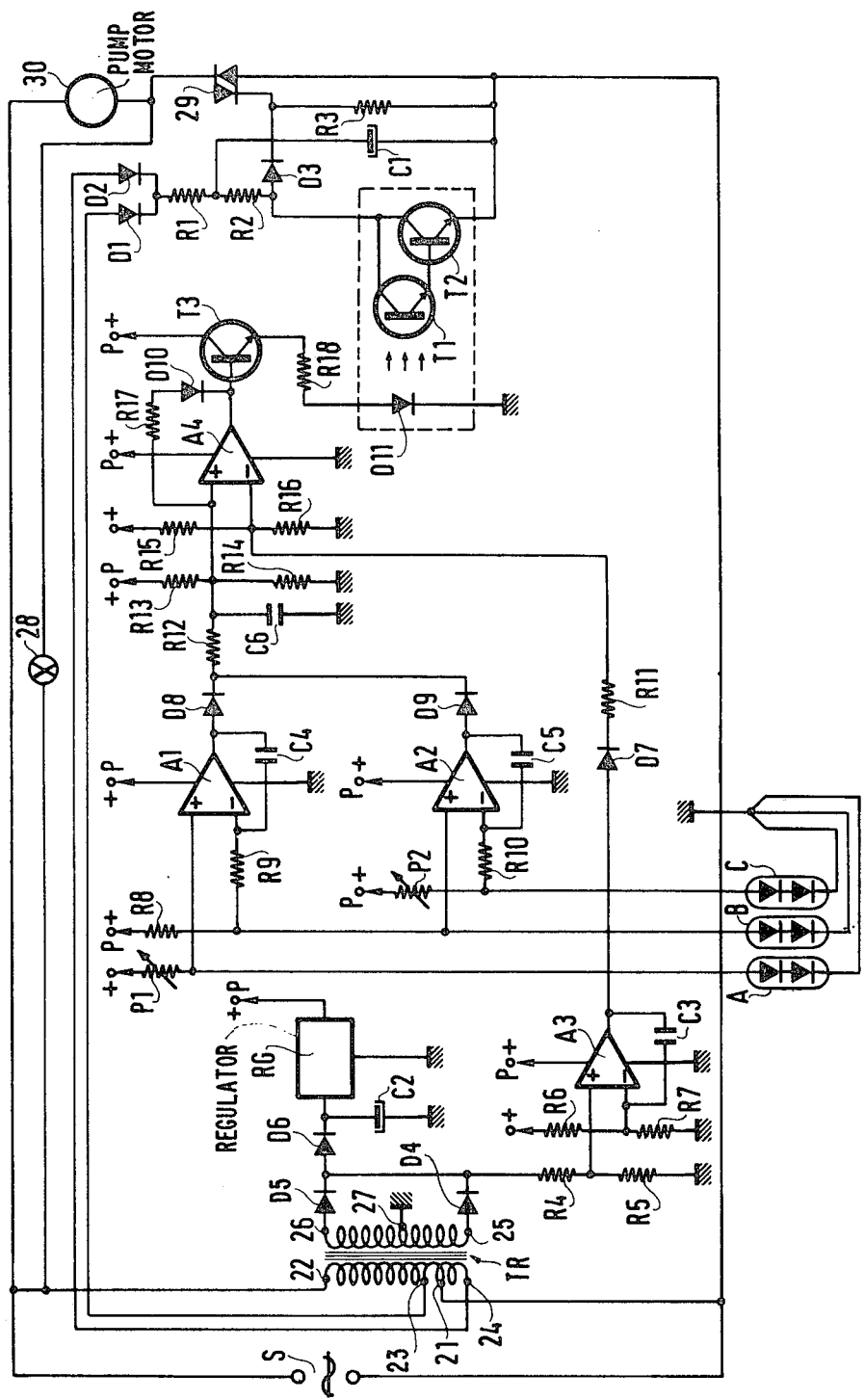
FIG. 2 is a diagram of an electric control circuit which may be used in some cases but not applying the method of the present invention.

FIG. 2 is a circuit diagram of a thermostat 8 for controlling the above described mode of operation.

Mains S is applied to the primary winding of a transformer TR between taps 21 and 22 thereon. The ends 25 and 26 of the secondary winding are connected to the anodes of respective diodes D4 and D5 whose cathodes are connected together, while the centre tap 27 of the secondary winding is connected to earth to constitute a conventional full-wave rectifier. The cathodes of the diodes D4 and D5 are connected firstly to the anode of a diode D6 and secondly to earth via a potential divider constituted by two resistors R4 and R5 connected in series. The cathode of the diode D6 is connected to a regulator RG which supplies a constant positive potential to a point P which constitutes the positive supply terminal of the circuit. A capacitor C2 filters the rectified current supplied to the regulator which is itself also connected to earth.

The point common to the resistors R4 and R5 is connected to the first input of an amplifier A3 whose second input is connected to the point common to two resistors R7 and R6 connected in series between earth and point P. The amplifier A3 is supplied between point P and earth, and a capacitor C3 is connected between its second input and its output.

A, B and C are the three temperature sensors illustrated in FIG. 1. In the example shown, they are constituted by three series of silicon diodes. These three temperature sensors are connected between earth on one side and point P on the other via a potentiometer P1 for A, via a resistor R8 for B, and via a potentiometer P2 for C.

The potentiometers P1 and P2 balance the power supply to the sensors so that temperature differences can be measured accurately.

The point common to the potentiometer P1 and to the sensor A is connected to a first, positive, input of an amplifier A1. The point common to the resistor R8 and to the sensor B is connected via a resistor R9 to the second, negative, input of the amplifier A1. A capacitor C4 connected between the second input and the output and power supply connections to earth and point P complete the circuits of the amplifier A1. connected to a first, positive, input of an amplifier A2. The point common to the potentiometer P2 and to the sensor C is connected via a resistor R10 to the second input of the amplifier A2. A capacitor C5 connected between the second input and the output and power supply connections to earth and point P complete the circuits of the amplifier A2.

The outputs of the amplifiers A1 and A2 are connected via diodes D8 and D9 respectively to one terminal of a resistor R12. The other terminal of the resistor R12 is connected to a first input of an amplifier A4. The point common to the resistor R12 and to the first input of the amplifier A4 is connected to the point common to two resistors R13 and R14 which are in series between point P and earth. It is also connected to earth via a capacitor C6. A second input of the amplifier A4 is connected via a diode D7 and a resistor R11 to the output of the amplifier A3. It is also connected to the point common to two resistors R15 and R16 which are in series between point P and earth. A circuit formed by a resistor R17 and a diode D10 is connected between the first input of the amplifier A4 and the output thereof. Further, the amplifier A4 draws its power between point P and earth. Its output is connected to the base of an NPN transistor T3 whose collector is connected to point P and whose emitter is connected via a resistor R18 to the anode of a light-emitting diode (LED) D11 which forms a part of an optical coupler which also includes Darlington connected NPN phototransistors T1 and T2. The emitter of the transistor T2 is connected to a first main electrode of a Triac 29, and its collector is connected to the anode of a diode D3 whose cathode is connected to the trigger of the Triac 29. A resistor R3 is connected between the trigger and the first electrode of the Triac 29.

An alternating potential is taken from two taps 23 and 24 on the primary winding of the transformer TR situated on either side of the tap 21. This potential is rectified by the diodes D1 and D2 which correspond respectively to taps 23 and 24. The cathodes of the diodes D1 and D2 are connected together and, via two resistors R1 and R2 in series, to the anode of the non-return diode D3. This constitutes the power supply circuit for the trigger of the Triac 29. A capacitor C1 is connected between the point common to the resistors R1 and R2 and the point common to the emitter of the transistor T2 and the first electrode of the Triac 29. The first electrode of the Triac 29 is also connected to the mains S and its second electrode is connected to a terminal of the motor 30 of the pump 3 (FIG. 1). The other terminal of the motor is connected to the mains S, and a neon lamp 28 which glows when the motor operates is connected between the terminals of the motor 30.

The installation operates as follows:

The amplifier A1 compares the potentials at the terminals of the sensors A and B, and the amplifier A2 compares the potentials at the terminals of the sensors B and C.

The amplifier A3 generates a pulse waveform at twice the frequency of the AC mains.

The amplifier A4 combines the data which comes from the amplifiers A1 and A2 and is modulated by the amplifier A3. It feeds the optical coupler D11—T1—T2 to turn the Triac 29 on or off, with turn on synchronized with the AC zero crossings, to avoid radio interference, whenever the amplifiers A1 and A2 enable the motor 30 to start operating.

The amplifier A4 has a feed back circuit R17—D10 which ensures that it switches completely when its output is negative, the Triac being switched on, thereby avoiding switching the Triac 29 on and off at each half cycle once it has been switched on.

If one (or both) of the amplifiers A1 or A2 ceases to enable motor operation, the amplifier 4 switches, its output becoming positive, and lights the LED D11 of the optical coupler. The corresponding phototransistor T1-T2 becomes conductive and shunts the supply current from the trigger of the Triac 29, which turns off when the current which it conducts passes through zero.

The power supply of the temperature sensors A, B and C is isolated from the mains both by the transformer TR and by the optical coupler D11—T1—T2. The point common to the sensors is earthed. All three sensors are supplied via pairs of wires of the same length and cross-section so as to retain as high an accuracy as possible in the differential values for turning the motor on and off.

The control unit which has just been described operates properly once circulation is established and so long as there remain differences in temperature between the various points of the fluid circuit. However, it has the disadvantage starting of the circulation of the heat conveying fluid when the temperatures $t_B$ and $t_C$ are equal. This disadvantage could be overcome by an automatic time delay electronic circuit or by a manual circuit for manually overriding the inhibition of the circulation, provided the fluid has not been circulating and has therefore not been able to give rise to the temperature differences necessary to maintain circulation.

Unfortunately in some cases, the time constant of such an automatic or manual circuit cannot be increased as much as the thermal time constants of the installation require it to be unless complex electronic circuits are provided which are expensive. That is why, in accordance with the present invention, the output signal of the amplifier A2, i.e. the signal which represents the difference $T_B - t_C$, constitutes a correction signal rather than a direct control signal on the operation of the motor 30, said correction signal being subtracted from the output signal of the sensor A applied to the positive input of the amplifier A1.

Figure 3:
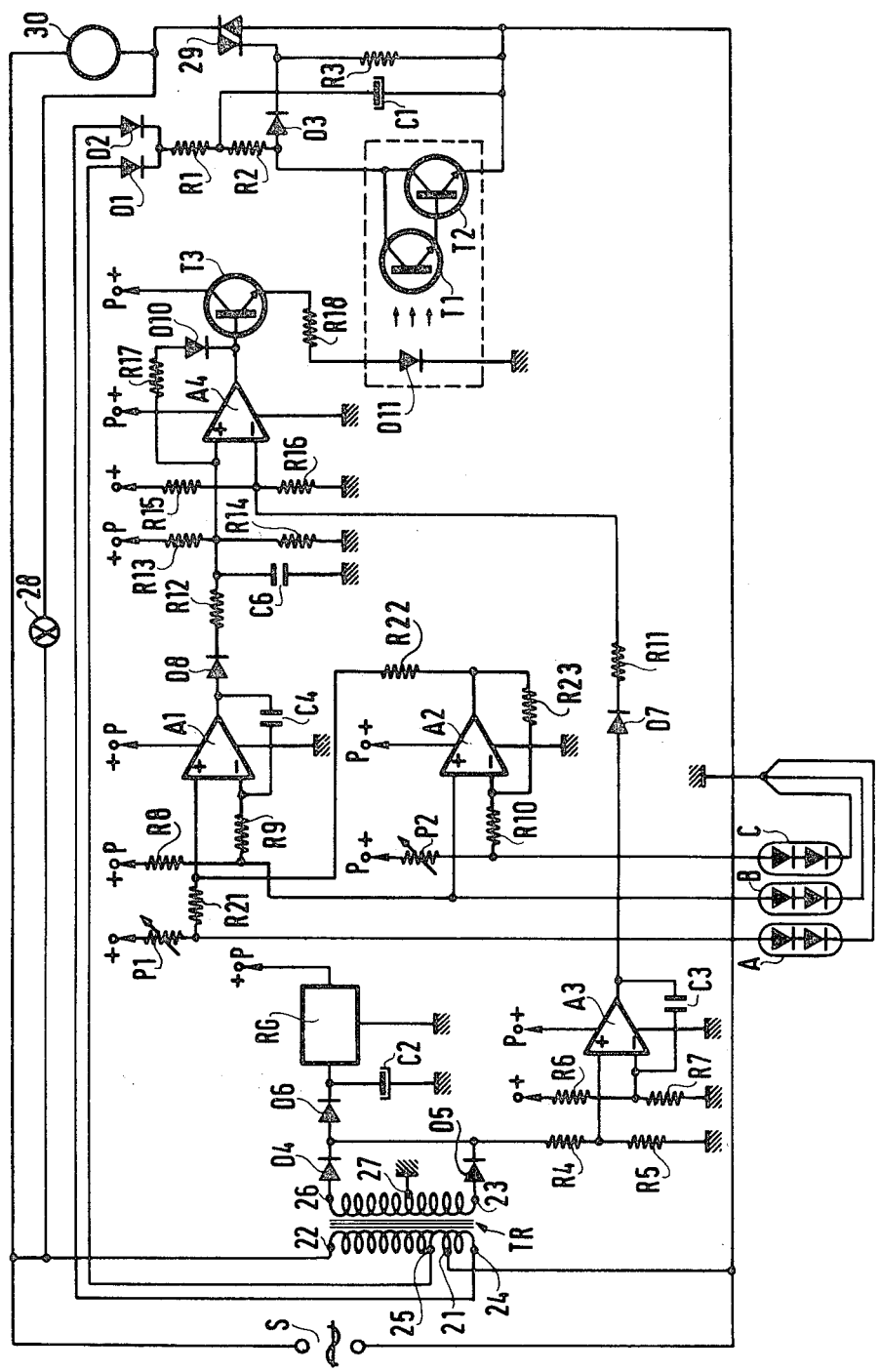
FIG. 3 shows schematically the circuit diagram of an electric control circuit applying the method of the present invention.

Therefore, the circuit of FIG. 3 is modified with respect to that of FIG. 2 as follows: there is no connection between the output of the amplifier A2 and the resistor R12 via a diode D9, nor is there a capacitor C5 between the negative input and the output of the amplifier A2. The capacitor C5 is replaced by a resistor R23 which co-operates with the resistor R10 to define the gain of the amplifier, whose output signal is applied to the positive input of the amplifier A1 via a resistor R22, the signal supplied by the sensor A being applied to the same input via a resistor R21. Therefore, the circulation of the fluid through the chamber stops and starts respectively when the temperature $t_A$ becomes lower or higher than a temperature $t_B + D_t$, Dt being a temperature offset such that the smaller the difference $t_B - t_C$, the greater the offset Dt.

Dt can be 10° C. when $t_B$ is not greater than $t_C$ and can be reduced substantially linearly to as little as 1° or 2° C. when the difference $t_B - t_C$ reaches 20° C.

The Triac system described hereinabove has the advantage of being able to operate several times per minute and it uses a maximum of solar energy available at the output of the solar collector.

We claim:

1. A method for controlling the heating of at least one heat storage chamber by means of a heat-conveying fluid, the method comprising:
    providing a fluid circuit which includes a heat source, a heat storage chamber and controllable means for ensuring the circulation of a heat-conveying fluid from the heat source and through the heat storage chamber;
    sensing the temperature $t_A$ of the heat-conveying fluid at its outlet from the heat source, the temperature $t_B$ of the heat-conveying fluid at its inlet to the heat storage chamber, and the temperature $t_C$ of the heat-conveying fluid at its outlet from the heat storage chamber; and
    controlling said controllable means to ensure that the heat-conveying fluid circulates from the heat source and through the heat storage chamber when $t_A$ is greater than $t_B + Dt$, and that the fluid stops circulating, at least through the heat storage chamber, when $t_A$ is less than $t_B + Dt$, where Dt is a temperature offset having a value which varies inversely with the value of the difference $t_B - t_C$.

2. A control method according to claim 1, wherein the temperature offset Dt varies linearly as an inverse function of the difference $t_B - t_C$.

3. A controllable heating installation for heating at least one heat storage chamber, said installation including:
    a fluid circuit including:
        a heat source;
        an upstream heat exchanger in thermal contact with said source; a heat storage chamber;
        a downstream heat exchanger in thermal contact with said heat storage chamber; and
        controllable mens for ensuring the circulation of a heat-conveying fluid from the upstream heat exchanger and then through the downstream heat exchanger;
    an upstream temperature sensor disposed for sensing the temperature $t_A$ at the heat-conveying fluid outlet from the upstream heat exchanger;
    an intermediate temperature sensor disposed for sensing the temperature $t_B$ at the heat-conveying fluid inlet to the downstream heat exchanger;
    a downstream temperature sensor disposed for sensing the temperature $t_C$ at the heat-conveying fluid outlet from the downstream heat exchanger; and
    a control unit which controls said controllable means, wherein the improvement comprises means in said control unit responsive to said intermediate and downstream temperature sensors to generate a value Dt which varies inversely with the value of the difference between $t_B$ and $t_C$ and means for actuating said controllable means to ensure that the heat-conveying fluid circulates from the heat source and through the heat storage chamber when $t_A$ is greater than $t_B + Dt$, and that the fluid stops circulating, at least through the heat storage cham- ber, when $t_A$ is less than $t_B + Dt$.

* * * * *

UNITED STATES PATENT AND TRADEMARK OFFICE
CERTIFICATE OF CORRECTION

PATENT NO. : 4,294,309
DATED : 13 October 1981
INVENTOR(S) : Pierre Godard and Michel Billot It is certified that error appears in the above—identified patent and that said Letters Patent is hereby corrected as shown below:

Column 2, line 21: after "the" insert --first--.

Column 3, line 49: after "amplifier A1." start new paragraph and insert --The point common to the resistor R8 and to the sensor B is also--.

Column 5, line 7: after "disadvantage" insert --of inhibiting--.

Column 5, line 22: change "$T_B - t_C$" to --$t_B - t_C$--.

Column 6, line 30: after "controllable" change "mens" to --means--.

Signed and Sealed this

Fifth Day of July 1983

[SEAL]

Attest:

GERALD J. MOSSINGHOFF

Attesting Officer

Commissioner of Patents and Trademarks